United States Patent [19]
Clarady et al.

[11] 3,845,374
[45] Oct. 29, 1974

[54] CIRCUITRY FOR CONVERTING AC POWER TO REGULATED DC POWER

[75] Inventors: Leroy E. Clarady; J. Jay McSweeney; Joe H. Smith, all of Houston, Tex.

[73] Assignee: B & C Industries, Inc., Houston, Tex.

[22] Filed: Aug. 18, 1972

[21] Appl. No.: 281,978

[52] U.S. Cl. .................... 318/445, 321/5, 321/18, 321/19
[51] Int. Cl. ............................................ H02p 1/00
[58] Field of Search ............. 321/5, 16, 18, 19, 23, 321/26, 40, 47; 322/25; 318/342, 344, 345

[56] References Cited
UNITED STATES PATENTS

| | | | |
|---|---|---|---|
| 3,305,763 | 2/1967 | Kupferberg et al. | 321/18 X |
| 3,329,883 | 7/1967 | Frierdich | 321/5 |
| 3,360,709 | 12/1967 | Etter | 321/18 |
| 3,377,542 | 4/1968 | Glorioso | 321/18 |
| 3,386,024 | 5/1968 | Koltuniak et al. | 321/5 |
| 3,394,298 | 7/1968 | Logan | 321/18 X |
| 3,404,328 | 10/1968 | Plow | 321/18 |
| 3,434,031 | 3/1969 | Wickliff | 321/18 X |
| 3,519,913 | 7/1970 | Janecek | 321/18 X |
| 3,566,245 | 2/1971 | Blokker et al. | 321/19 X |
| 3,707,669 | 12/1972 | Kanngiesser | 321/5 X |
| 3,746,969 | 7/1973 | Gessaroli et al. | 323/22 SC |

*Primary Examiner*—William M. Shoop
*Attorney, Agent, or Firm*—Torres & Berryhill

[57] ABSTRACT

Control circuits for gating silicon controlled rectifiers (SCR's) to provide a direct current (DC) output which may be used to energize and control DC motors and to supply DC energy for other uses such as electric welding. Feedback regulating means are provided for maintaining a preselected current and/or voltage output at the load irrespective of changing load conditions. In the preferred form of the invention, three SCR's and three control circuits are used to provide separately controlled rectification of each phase of a three phase alternating current source. A selected percentage of the positive portion of each input cycle in each phase is gated to the load through the SCR's as required to provide a predetermined current and/or voltage output. Feed-back regulation changes the firing angle of the SCR's in each phase as required to maintain the selected current and/or voltage output. The control circuits are isolated from the load and synchronized with the source by transformer coupling. When the three phase control is employed to power a DC motor, a fourth single phase circuit is used to provide full wave rectified voltage and current to the field winding of the motor. Means are provided for simultaneously adjusting the current and voltage output of the three phase and single phase circuits as required to change the speed and torque output of the DC motor. SCR switching means are provided for reversing the polarity of the applied voltage on the field winding to reverse the direction of motor rotation.

17 Claims, 3 Drawing Figures

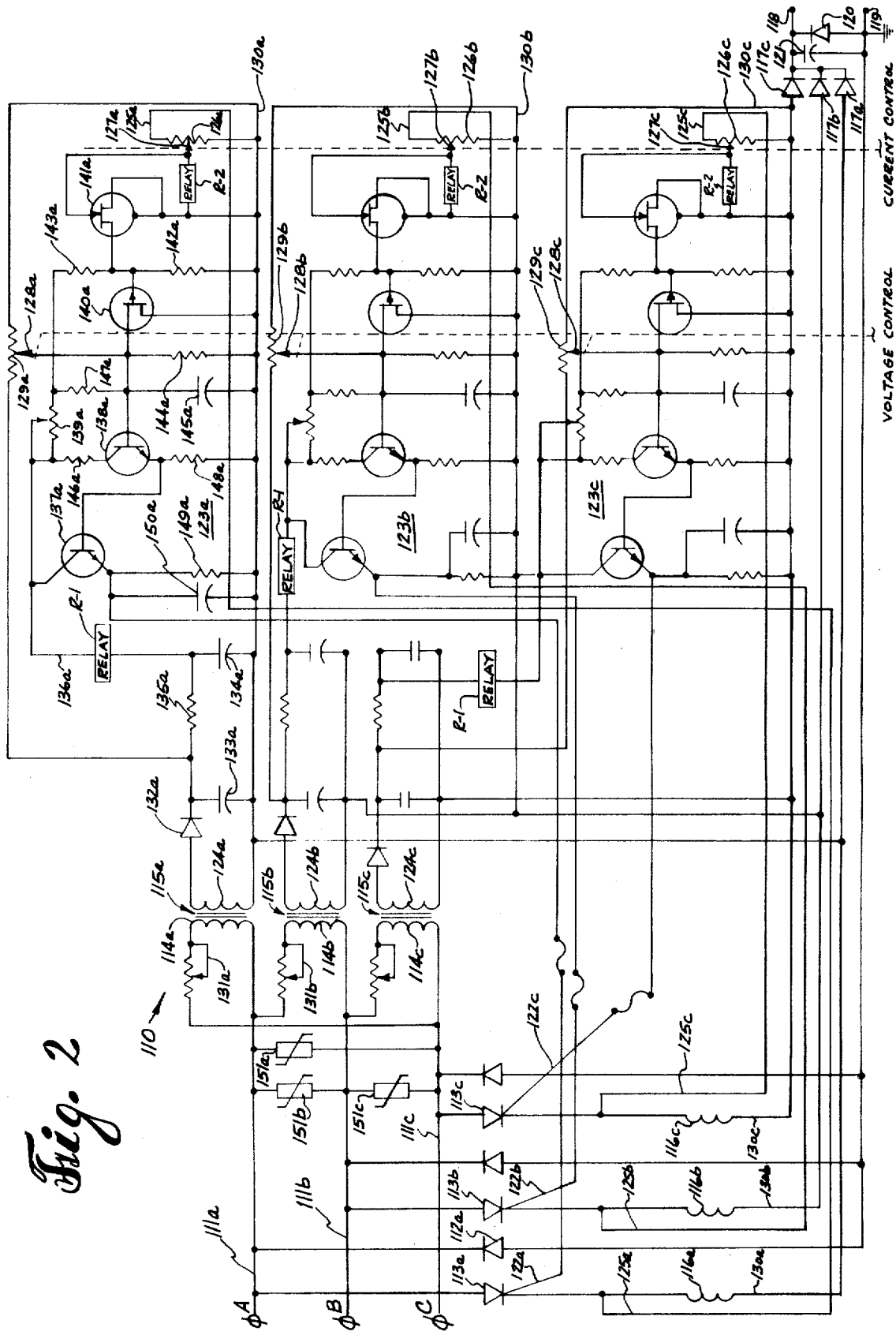

3,845,374

CIRCUITRY FOR CONVERTING AC POWER TO REGULATED DC POWER

BACKGROUND OF THE INVENTION

1. Field of the Invention

The present invention relates to means for changing energy in the form of alternating electrical current into energy in the form of direct current electrical energy. The invention also relates to means for permitting selection of a desired value of direct current voltage and/or current output to be delivered to an electrical load and means for automatically maintaining the selected value as the load or source fluctuate. A specific application of the invention described herein relates to means for converting three phase, alternating current to direct current for supplying a selected voltage and current to the armature of a direct current motor and means for converting a single phase alternating current source to direct current for supplying a selected current and voltage to the field winding of the motor.

2. Description of Prior Art

SCR's, which have been widely accepted for use in power control circuits, are "triggered" by a variety of control circuits, some of which in single phase systems provide feedback regulation for maintaining a selected output. The three phase SCR control circuits known to applicants for producing direct current outputs gate selected portions of the positive and negative half cycle of each input a a rectifying circuit which provides the direct current output. Full control of the conducted half cycles is difficult to obtain in these systems. Conventional control circuits employed to trigger the SCR's are often directly coupled with the load and source so that the trigger pulse amplitude and phase angle vary with changes in the source and load. This latter characteristic in prior art systems may cause the value of current and voltage supplied to the load to undesireably fluctuate. Moreover, ground currents caused during each reversal in the polarity of the alternating current appearing in the SCR switching and rectifying circuitry and alternating current in control circuits which may employ oscillators or other pulse sources generate electrical noise which can interfere with the operation of radios and other electronic equipment. This problem may be acute where conventional circuitry is used to convert three phase AC to supply direct current to a load, as for example electric welding equipment on an offshore oil drilling platform, where the resulting AC noise prevents radio communications between land based installations and the platform.

SUMMARY OF THE INVENTION

In the preferred form of the present invention, as applied to a three phase system, current in each phase of a three phase alternating current source is supplied to a separate SCR which is triggered by its own independent control circuit to conduct a desired portion of the source current to the load. The non-conducted portions are blocked from the load so that the load is directly supplied with a controlled amount of direct current.

The separate control circuits for each phase are transformer coupled to the source and blocked from the load to isolate the control circuits from fluctuations in the load and source. Each of the three control circuits is independent of the other two and may be operated to provide an output at the load terminals even if one or both of the other two circuits are inoperative. The induced transformer signal in each control circuit is rectified and shaped to produce a hard firing, constant amplitude trigger pulse from energy supplied by the source phase which the SCR controls. The control circuit also keeps the gate of the SCR at a negative potential relative to the cathode except when the trigger pulse is formed to prevent undesired conduction through the SCR. With this design, needs for both an oscillator or other pulse source and a synchronizing circuit are eliminated and AC noise in the control circuit is avoided. Delay means are provided so that if desired, the trigger pulse may be applied to the gate of the SCR subsequent to the termination of the source voltage excursion which supplied energy for forming the pulse. By this means the SCR may be triggered into conduction at the onset of a subsequent voltage excursion in the same source phase.

A voltage drop across an inductance coil in series between each of the SCR's and the load is employed to form a regulating signal which is fed back to the control circuit in the SCR in that phase for changing the time of occurrence of the trigger pulse. This in turn changes the percentage of the source current conducted to the load as required to maintain a preselected current and/or voltage output at the load irrespective of changes in the source or load. The inductance coil also smooths the wave form of the conducted direct current to reduce the ripple in the output and to suppress noise. The feedback regulation also prevents initial surge current and provides for a "soft start" when the circuit is employed to supply power to electric motors.

Ganged potentiometers in each of the three control circuits are provided for steplessly changing the current and voltage delivered to the load. Separately adjustable potentiometers in each of the three control circuits permit the three phases to be matched to compensate for phase-to-phase variations in component characteristics.

Protection elements in the input to the coupling transformers clip transient voltage excursions in the supply to prevent such excursions from forming a trigger pulse. Protective elements in the control circuits prevent load induced transients and negative voltages at the load from interfering with proper operation of the control circuit and also prevent damage to the components of the control circuit.

When control for a DC motor is desired, the foregoing three phase circuit is employed to supply controlled regulated direct current and voltage to the motor armature and a similar single phase field circuit is employed to provide controlled power to the field winding of the motor.

The field circuit includes a full wave bridge which provides full wave rectification of a single phase AC input. The rectified voltage is reduced across dropping resistors to form a control circuit voltage which is supplied to control circuitry to form a trigger pulse for each one half cycle of the AC input. The trigger pulses bias one of two controlled SCR's in the rectifier bridge into conduction to conduct selected portions of each half cycle of the full wave rectified input to the field winding. The polarity of the applied field winding voltage is selected by a switch which applies the control voltage to the gate of one or the other of two sets of SCR's which then supply the voltage to the desired side of the field winding. By this means, the direction of motor rotation may be reversed under full load conditions by simply reversing the polarity of the field voltage. The field control circuit provides a regulating feedback signal to change the time of occurrence of the trigger pulse as required to maintain a desired output at the field winding. Potentiometers in the field control circuit are ganged with those in the three phase control circuits for the armature power to simultaneously change the voltage and current at the armature and field as required to change the speed of motor rotation and the torque output of the motor, respectively. Where several motors are to be powered by the same DC source, a separate field control circuit may be employed to command load sharing. Protective components in the field control circuit prevent false triggering from induced transient voltage, and also protect the SCR gates from exposure to damaging voltage transients.

The three phase circuit of the present invention may be connected to any three wire source by any conventional wiring technique such as delta, wye or other without need for a fourth wire. True ground potential may be employed as the negative load terminal. Elimination of the fourth wire and the attendant alternating current flowing in the wire eliminates much of the radio interfering noise found in many conventional systems.

Sufficient delay circuitry is included in the control circuit so that the trigger pulse may be formed at any desired time during the occurrence of a foreward bias on the SCR anode-cathode terminals. Each of the control circuits is independently adjustable and operable to provide conduction of any desired percentage of the input to the load. The percentage of the input conducted to the load may be the same for each phase or, within limits, may be different in each phase as required to provide and maintain a selected output.

The foregoing features and advantages of the present invention will be more readily appreciated from the following specification, drawings and the related claims.

BRIEF DESCRIPTION OF THE DRAWINGS

FIG. 2 is a circuit diagram illustrating a three phase circuit for supplying armature current and voltage to a DC motor.

DESCRIPTION OF THE ILLUSTRATED EMBODIMENTS

Figure 1:
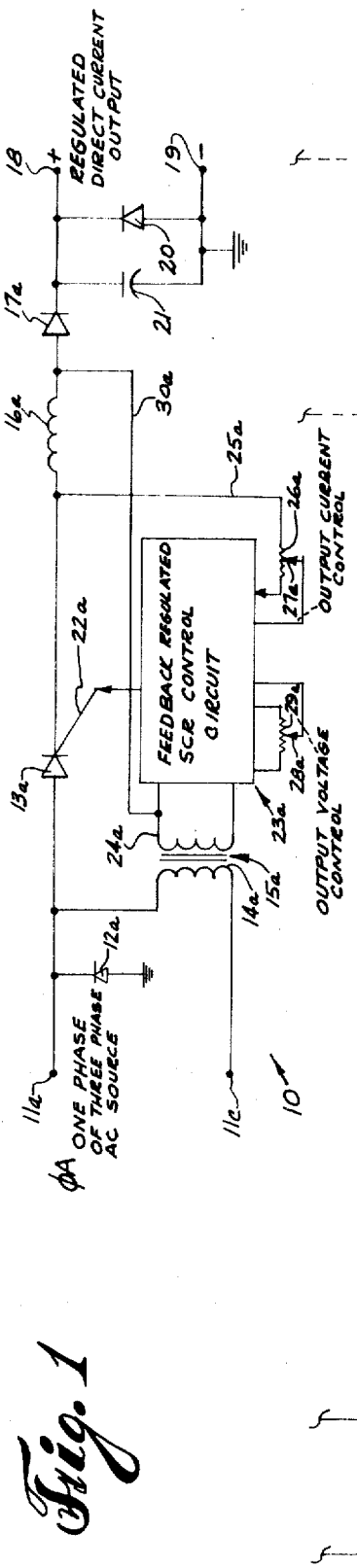
FIG. 1 is a schematic representation illustrating one phase of a polyphase circuit constructed in accordance with the present invention.

Referring to FIG. 1, one phase of a three phase control system employing the present invention is indicated generally by the circuit 10. The input to the circuit appearing on input terminals 11a and 11c is one phase of a conventional, three phase alternating current source (not illustrated). The source may be a three phase generator or other source of polyphase alternating current. A diode 12a is connected from the input 11a to ground and the alternating current input to the terminals 11a and 11c appears at the anode of an SCR 13a and across the primary winding 14a of a coupling transformer indicated generally at 15a. The cathode of the SCR 13a is connected through a feedback element represented by a feedback choking coil 16a and through a blocking diode 17a to a positive load terminal 18. A second load terminal 19 connected to true ground provides the negative reference for the DC output A free wheeling diode 20 and a filter capacitor 21 connected between the two load terminals provide circuit protection from induced load transients and negative load voltages. The capacitor 21 also assists in reducing the AC ripple in the DC output.

Conduction of the SCR 13a is controlled by a trigger pulse supplied over a gate 22a. The trigger pulse is formed in a feedback regulated, SCR gate control circuit indicated generally at 23a. The circuit 23a is designed to produce a trigger pulse having an adjustable phase angle and amplitude. Power for the circuit 23a is preferably obtained through a secondary winding 24a in the transformer 15a, however any source of constant level DC may be employed. A feedback signal is conducted from the feedback element 16a to the circuit 23a by a feedback line 25. The signal on the feedback line 25a connects to a potentiometer resistance element 26a having an adjustable contact 27a which is positioned to obtain a desired load or output. The value of the output voltage is selected by the positioning of a movable contact 28a on a potentiometer resistance element 29a. A line 30a connected between the anode of diode 17a and the secondary winding 24a provides a common or control circuit ground potential for the control circuit 23a.

In operation, the contacts 27a and 28a are adjusted to establish the time of occurrence or phase angle of a trigger pulse produced by the circuit 23a and applied to the gate 22a. The SCR 13a conducts current when its anode voltage is positive with respect to its cathode voltage and when the gate voltage is also positive with respect to the cathode voltage. These conditions exist simultaneously when the trigger pulse is formed and when any part of the relatively positive portion of the source voltage is present between the input terminals 11a and 11c.

The time of generation of the trigger pulse may be changed by adjustments in the circuitry 23a to select any desired portion of the positive part of the input current to flow through the SCR to the load for establishing a desired direct current output. As the current delivered to the load terminal 18 varies either because of variations in the amount of current supplied to the input or because of variations in the load characteristics, the voltage drop across the coil 16a produces a feedback signal which automatically alters the time of generation of the trigger pulse to gate more or less current through the SCR 13a as required to re-establish the originally selected current and voltage output. The choke also acts to suppress radio frequency noise which may be present in the source. In a three phase system, the controlled current gated through the SCR's in each phase is conducted to the terminal 18 so that the combined effect of all phases appears at the terminal 18.

FIG. 2 illustrates a detailed circuit diagram indicated generally at 110 for a three phase system, each phase of which operates in a manner similar to the circuit 10 in FIG. 1. For purposes of the description to follow, the circuits have been designated as Phases A, B and C. In FIG. 2, the same reference number is employed for the same component in each phase and the components in the various phases are differentiated by addition of the reference letter $a$, $b$ or $c$ depending upon which phase is being described. The reference characters identifying components in each phase of the circuit 110 are higher by 100 than the reference characters identifying the same or corresponding components in the circuit 10 of FIG. 1. Components in the circuit 11 operate in the manner described previously for the corresponding component in the circuit 10 and will not be again described.

The SCR's 113a, 113b and 113c function as switching means for phases A, B and C, respectively, for electrically connecting or disconnecting the load terminals 118 and 119 of the circuit 210 with the energy in the associated phase of the source. The diodes, corresponding to the diode 112a, in the circuits for each phase act as polarity responsive means for continuously preventing current wave forms of a first polarity relative to the wave forms in associated source phases A, B and C from connecting with the output terminals 118 and 119.

With specific reference to phase A, the circuit 110 includes an adjustable dropping resistor 131a employed to establish the input voltage to the primary winding 114a and to balance the input to phase A with the inputs to phases B and C. The induced voltage appearing on the secondary winding 124a is half-wave rectified by a diode 132a and supplied to a DC filtering circuit formed by capacitors 133a and 134a and a resistance 135a. The pulsating, rectified DC voltage is supplied to the output voltage control potentiometer resistance element 129a which is connected between the diode 132a and control circuit ground 130a.

The rectified and filtered voltage appearing across the capacitor 134a is conducted by a supply line 136a to the collector circuits of two NPN timing transistors 137a and 138a. An adjustable dropping resistor 139a is employed to set the collector-to-base voltage for the transistor 138a as required to obtain the desired circuit performance and to match the operation of phase A with that of phases B and C. The dropping resistor 139a also provides an adjustment for overcoming differences in the characteristics of the same components employed in each of the three different control circuits. Two amplifying field effect transistors 140a and 141a are also supplied with DC power through the dropping resistor 139a. The field effect transistor (FET) 140a is a P-channel junction transistor and FET 141a is an N-channel junction transistor with a grounded metallic shield. A load resistor 142a is connected between the source terminal of the transistor and the dropping resistor 139a. A load resistor 144a and timing capacitor 145a are in parallel between the source terminal of FET 140a and control circuit ground. Resistors 146a and 147a provide the desired operating bias for the transistor 138a and a resistor 148a acts as a load resistor for the transistor. A resistor 149a and a capacitor 150a connected in parallel in the emitter circuit of the transistor 137a provide the desired gate signal to the gate terminal 122a of the SCR 113a.

In operation, a sinusoidal alternating current wave form is applied between the line 111a and 111b at the input to the phase A circuitry. A varistor 151a connected between the lines 111a and 111b prevents transient voltage spikes in the input wave form from entering the control circuit. The alternating current input wave form appears in the primary winding 114a and produces a similar, opposite polarity voltage wave form in the secondary winding 124a. The positive portions of the induced voltage in the winding 124a are conducted through the diode 132a to the potentiometer 129a to provide a trigger pulse. The negative one-half cycle of the induced voltage wave is blocked.

The pulsating voltage appearing at the cathode of diode 132a is dropped across the potentiometer resistance element 129a. The portion of this voltage drop which is applied to connected circuit components in the control circuit 123a is determined by the position of contact 128a which in turn establishes the charge rate of the timing capacitor 145a and thus controls the voltage occurring at the power output load terminal 118. The output voltage with no load current is thus also established by the setting of the contact 128a. The current supplied to the positive DC terminal 118 from phase A is regulated by the position of the contact 127a on the potentiometer resistance element 126a and the feedback voltage supplied to the element 126a. Voltage changes across the element 116a caused by changes in the source or load produce a voltage change which is communicated by the line 125a to the feedback potentiometer resistance element 126a. The feedback signal is amplified and combined with a preselected bias to change the phase angle of the control circuit trigger pulse which is then used to regulate conduction of the SCR 113a.

In operation, with the FET 141a in its nonconducting condition, the voltage between the potentiometer contact 128a and control circuit ground 130a is applied across the capacitor 145a which provides a DC bias on the base of the transistor 138a. When the preselected bias is established, the transistor 138a conducts and the resulting voltage produced across the emitter resistor 148a raises the voltage on the base of the transistor 137a causing the transistor to conduct which permits current flow through a resistor 149a in the circuit. The voltage developed across resistor 149a charges the capacitor 150a to the polarity marked in the drawing. The positive plate of the capacitor 150a is connected to the gate 122a of SCR 113a and the negative plate is connected to the cathode of the SCR through the feedback coil 116a. When the indicated polarity charge is established on the capacitor 150a a "trigger pulse" is produced and the gate of the SCR 113a is positive with reference to the cathode. Under these conditions, the SCR will conduct when it is forward biased by the phase A input. When the transistor 138a is nonconducting, the base of transistor 137a has a low voltage applied to it and that transistor is also nonconducting. Resistance 149a in the emitter circuit of transistor 137a is of a relatively low value so that when transistor 137a is not conducting, the voltage across the emitter circuit resistance is approximately equal to that of the control circuit ground 130a. This low voltage maintains a fixed negative bias on the gate circuit 122a which prevents conduction of the SCR 113a even when the SCR is forward biased. From the foregoing, it will be appreciated that the control circuit 123a for the SCR 113a is independent of the control circuits 123b and 123c so that neither of the latter two control circuits affect conduction of the SCR 113a.

The SCR 113a is fired or triggered into conduction by the control circuit 123a as required to maintain a pre-determined voltage and current output between the terminals 118 and 119. To this end, changes in the current flowing through the feedback choke coil 116a are communicated over the line 125a to the feedback resistance element 126a in the feedback potentiometer. A positive voltage on the contact 127a of sufficient magnitude acting on the gate of the FET 141a biases the FET into conduction in a well known manner so that increasing current flows between the source and drain terminals of the FET. Conduction of the FET 141a lowers the potential of the voltage acting on the gate of the FET 140a which in turn causes the latter transistor to begin conducting increased amounts of current between its source and drain. The FET 141a and 140a thus act to amplify the feedback signals appearing on the line 125a.

When the FET 140a is conducting between its source and drain terminals, the charge on the capacitor 145a is reduced and the base potential of the transistor 138a is lowered toward the potential of the control circuit ground 130a. The feedback and control voltages required to establish the cut off point for the transistor 138a may be altered by changing the setting of the contact 127a on the resistance 126a. This latter adjustment establishes the current output for the system. Each positive half cycle of the input wave form produces a trigger pulse when the transistor 137a conducts so that the trigger pulse when produced has a frequency equal to half that of the input wave form.

The FET 140a cooperates with the load resistor 144a and the capacitor 145a to provide a delay circuit which regulates the phase angle of the trigger pulse. Thus, the RC time constant of the circuit is variable from a resistance value equal to the value of resistor 144a when FET 140a is nonconducting to a value slightly less than the source to drain resistance of the FET when it is fully conducting. This variation in the time constant permits the trigger pulse to be formed over a relatively long time interval so that it can gate all or any portion of a positive half cycle of input current through the SCR. Delays of as much as one second or more are possible by proper selection of component values. An adjustment which keeps the transistor 138a in a continuously conducting condition provides the maximum current output for that phase.

The potentiometer wiper contacts 128a, 128b and 128c are mechanically linked or ganged so that a single movement will simultaneously effect similar resistance changes in each of the three phases. The desired voltage setting may thus be established by positioning the three contacts with the voltage control linkage. A small, reversible DC motor (not illustrated) may be employed to drive the ganged potentiometer contacts in a direction to increase or decrease the output voltage. In a similar manner, the contacts 127a, 127b and 127c in the feedback potentiometer are physically linked to each other so that a single mechanical movement effects simultaneous change of the position of each of the three contacts as required to establish a desired current output. Before being mechanically linked, the contacts 126 in each phase are separately adjusted to provide phase balance.

Figure 3:
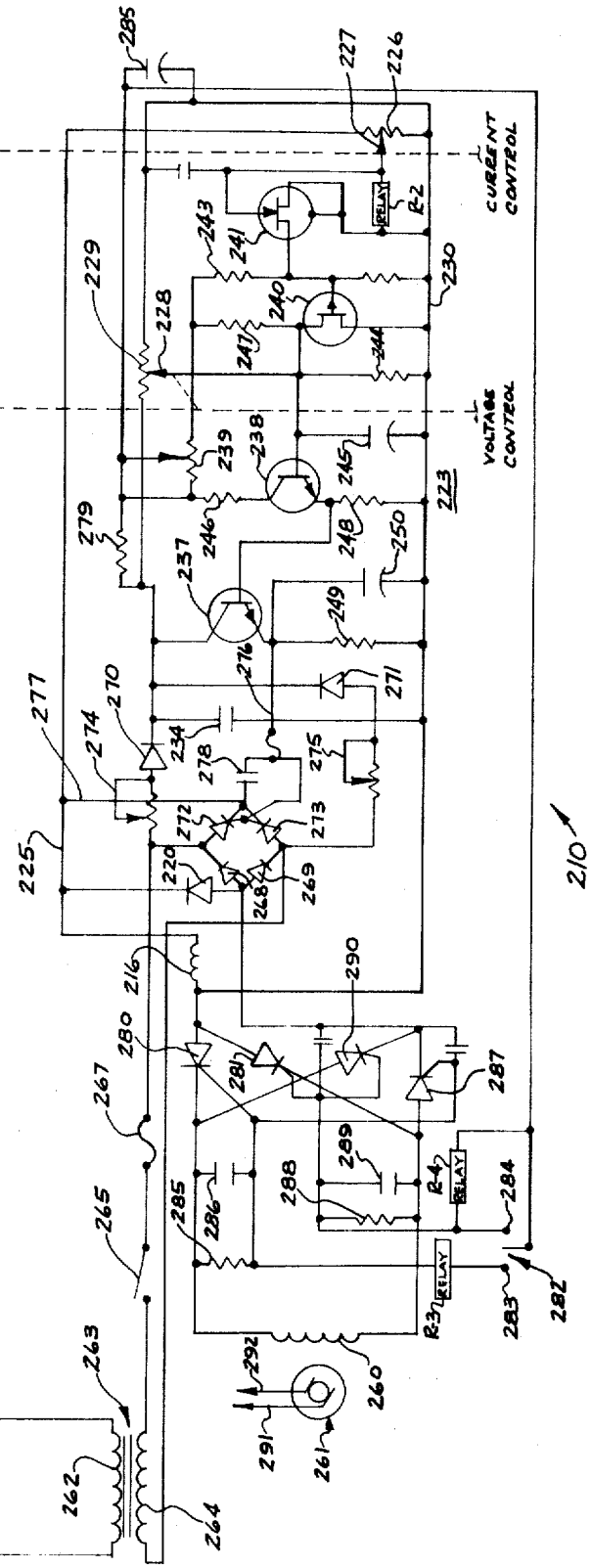
FIG. 3 is a circuit diagram illustrating a single phase circuit for supplying field current and voltage to a DC motor.

While the circuit 110 illustrated in FIG. 2 has been described with reference to a three phase circuit, it will be appreciated that the teachings of the present invention may be applied to a circuit having any number of phases. In this regard, FIG. 3 illustrates a single phase circuit indicated generally at 210 which incorporates the teachings of the present invention. Components of the circuit 210 which are similar to those described in the circuit 110 carry a reference number which is 100 higher than the reference character for the corresponding component in circuit 110. The circuit 210 is specifically designed to provide direct current power to the field windings 260 of a DC motor indicated schematically at 261. Means are included in the circuit 210 for reversing the polarity of the applied voltage on the windings 260. The control circuit 223 is similar to the control circuits 123 described with reference to FIG. 2. In DC motors, the direction of rotor rotation depends on the polarity of the field winding voltage, rotor speed depends on the armature winding voltages and output torque depends on the current in the armature.

Single phase alternating current is supplied through a primary winding 262 in an input transformer indicated generally at 263. A secondary winding 264 provides a desired alternating current voltage to energize the field windings 260 and to power the control circuit 223. The voltage induced in the secondary winding 264 is supplied through a switch 265 and fuse 267 to a full wave bridge rectifier formed by diodes 268, 269, 270 and 271 and two SCR's 272 and 273 connected in the manner illustrated. The gates for the two SCR's 272 and 273 are connected together and are supplied with the trigger pulse formed by the control circuit 223.

The four diodes in the bridge function in a conventional manner to provide full wave rectified DC voltage at the cathodes of the two diodes 270 and 271. Adjustable dropping resistors 274 and 275 provide means for separately controlling the amplitude of the DC voltage supplied to the anodes of the two diodes 270 and 271. A capacitor 234 smoothes the rectified voltage appearing at the diode portion of the bridge output and an adjustable dropping resistor 279 lowers the voltage to that required to supply the transistors 237 and 238.

A line 276 supplies the trigger pulse formed by the control circuit 223 to the joined gate terminals of the two SCR's 272 and 273 to control conduction of the two SCR's. The conducted portion of each positive half cycle of the full wave rectified voltage is supplied by a connecting line 277 to the field windings and to the feedback line 225. A blocking capacitor 278 prevents the DC voltage on the cathodes of the SCR's from communicating with the SCR gates.

In the circuit 210, a trigger pulse may be produced for each half cycle of the input wave form. The trigger pulse is used to control conduction of the SCR's 272 and 273 for a selected portion of the half wave during which one or the other of the SCR's is forward biased. The phase angle or time of occurrence of the trigger pulse relative to the input wave form is determined in the manner described previously with reference to the circuit 110. The primary difference between the control circuit 223 and the control circuit 123 is that the former produces a trigger pulse for each half wave of the input whereas the latter produces only a single trigger pulse per cycle. As with the circuits 10 and 110, the voltage drop across the choke coil 216 is fed back over the line 225 to change the phase angle of the trigger pulse as required to resist changes in current flow through the coil.

The rectified, controlled and regulated DC voltage produced by the full wave bridge is applied to the anodes of two SCR's 280 and 281 which are included as part of a field winding polarity reversing circuit. A switch indicated generally at 282 is positioned on terminal 283 or terminal 284 to apply a DC voltage level developed across a capacitor 285 to the gate terminal of either SCR 280 or SCR 281. When the switch 282 is moved into contact with the switching terminal 283, a DC voltage is developed across a resistor 285 and a capacitor 286 connected in parallel between the cathode and gate terminals of the SCR 280. The charge developed on the capacitor 286 forces the gate of SCR 280 positive with respect to its cathode so that the SCR may conduct. The trigger signal supplied to the gate of SCR 280 is also communicated to a second gate 287 which supplies a return path for the current entering the top positive end of the winding 260.

When the switch 282 is moved into contact with the switching terminal 284, the DC trigger voltage is developed across a resistor 288 and capacitor 289 connected in parallel between the gate and cathode of the SCR 281. This biases the SCR 281 into conduction and the same signal is also provided to the gate of an SCR 290 which provides a return path for the current when the lower end of the coil 260 is positive. From the foregoing, it will be appreciated that the SCR's 280, 281, 287 and 290 provide a reversing circuit which controls the polarity of the field winding voltage.

The adjustable contacts on the voltage control and current control potentiometers in the circuit 210 may be ganged with those in the circuit 110 and the circuit 110 may be employed to supply power to the armature of the motor 261 over leads 291 and 292. The control circuit 110 is connected to the armature of motor 261 by connecting armature leads 291 and 292 to the control circuit load terminals 118 and 119. When thus connected, a single control may be employed to simultaneously set the voltage and current output in each of the three phases in the armature circuit and in the single phase of the field circuit.

Normally open relays R–1 provided in the circuit 110 are suitably linked to each other to open as required to de-energize the armature and field windings when the voltage in the field winding is lost for any reason. With the relays open a negative bias is held on the gates 122 since the transistor 137 cannot conduct. This prevents the SCR 113 from conducting so that no voltage is applied to the load to prevent damage to the armature winding of the motor 261. Relays R–2 close to ground the feedback signal when the motor direction is to be suddenly reversed at full reverse current. Depending upon the desired direction of rotation R–3 or R–4 is opened when motor direction is reversed at full output. The latter controls are particularly suited for use where the present invention is employed to power an electric power swivel used for drilling wells. In this application, the direction and speed of motor rotor rotation must be controlled from a panel and the circuits 110 and 210 are particularly adapted for panel control. If desired, the functions of relays R–1, R–2, R–3 and R–4 may be performed by conventional solid state controls.

When the output of circuit 110 is used as an armature supply circuit means for the motor 261, and the circuit 210 is used as the field circuit means for the motor, the SCR's 113a, 113b and 113c in circuit 110 provide first SCR switching means for controllably connecting electrical energy from a source to the armature of the motor 261 and the SCR's 272 and 273, operating alone or with the SCR's 280, 281, 287 and 290, provide second SCR switching means for controllably connecting electrical energy from a source to the field windings 260 of the motor 261.

It will be appreciated that the circuits 10, or 110 may be modified, if desired, to conduct only selected portions of the negative half cycles of the input waveform. Additionally, the feedback coils 16, 116 and 216 may be replaced with other voltage dropping means such as a shunt or precise resistance element. Use of a coil is considered preferable, however, since it assists in filtering rf noise out of the DC output. If desired, the control circuits 23, 123 and 223 may be provided with plural amplification stages in the form of integrated circuits. While stepped-down rectified line voltage has been described as providing the DC supply for the control circuits, a separate source of DC could be employed.

When the circuit 110 is employed to supply power to welders or other DC devices the polarity reversing switch circuitry shown in FIG. 3 may be used with the circuit. This permits reversal of the polarity of the output by a control switch which does not carry the full load current.

The foregoing disclosure and description of the invention is illustrative and explanatory thereof, and various changes in the size, shape and materials as well as in the details of the illustrated constructions may be made within the scope of the appended claims without departing from the spirit of the invention.

We claim:

1. A circuit for supplying controlled power to a direct current motor having armature and field windings comprising:
   a. armature supply circuit means having first SCR switching means for controllably connecting electrical energy from a source to the armature windings of said motor;
   b. first control circuit means connected with the gate means of said first SCR means for controlling the percentage of source energy conducted through said first SCR means to said armature windings;
   c. first regulating means connected with said first control means for changing the amount of time said first SCR means conduct as required to maintain a preselected output at said armature windings irrespective of changes in the energy taken by the armature windings or changes in the energy appearing in the source;
   d. field circuit means having second SCR switching means for controllably connecting electrical energy from a source to the field windings of said motor;
   e. second control circuit means connected with the gate of said second SCR means for controlling the percentage of source energy conducted through said second SCR means to said field windings; and
   f. second regulating means connected with said second control means for changing the amount of time said second SCR means conducts as required to maintain a preselected output at said field windings irrespective of changes in the energy taken by the field windings or in the energy appearing in the source energy supplied to said field circuit means.

2. A circuit as defined in claim 1 wherein said armature supply circuit means includes means for blocking alternating current wave forms of a single polarity appearing in a three phase AC source and conducting selected percentages of the opposite polarity wave form from each of the phases to provide a controlled amount of DC energy to said armature windings.

3. A circuit as defined in claim 2 wherein said field circuit means includes means for full wave rectifying an AC waveform from a single phase power source and for conducting a selected percentage of each half wave to the field windings to provide a controlled amount of DC energy to said field windings.

4. A circuit as defined in claim 3 further including solid state switching means for changing the polarity of the voltage appearing across the field windings to reverse the direction of motor rotor rotation.

5. A circuit as defined in claim 4 further including separately operable control circuit means for each phase of said armature circuit means and for the single phase of said field circuit means whereby the amount of energy conducted through SCR means in each separately operable control circuit means may be separately adjusted and feedback regulated.

6. A circuit as defined in claim 5 further including ganged linkages between said separately operable control circuit means for simultaneously effecting changes in the output of each of said three phases in the armature circuit and the single phase of the field circuit to change the speed of motor rotor rotation or the torque output of the motor.

7. A circuit as defined in claim 6 further including circuit interrupting means for terminating feedback regulation when the direction of motor rotation is to be suddenly stopped and reversed.

8. A circuit as defined in claim 6 further including circuit interrupting means for terminating the supply of energy to said armature windings when voltage across said field windings falls below a predetermined minimum value or is lost.

9. A control system for regulating the energy transferred to electrical load terminals from a polyphase, alternating current electrical source comprising:
   a. switching means for each phase of said system for electrically connecting said terminals to or disconnecting said terminals from the energy in the associated phase of said source;
   b. polarity responsive means in each of said switching means for continuously preventing current wave forms of a first polarity relative to the wave forms in associated source phases from connecting with said terminals;
   c. control means for each phase connected with each of said switching means for controlling the percentage of current wave forms of a second, opposite polarity conducted to the load terminals; and
   d. adjustable setting means included in said control means for establishing a desired current and/or voltage value at said output terminals.

10. A control system for regulating the energy transferred to electrical load terminals from a three phase, alternating current electrical source comprising:
   a. switching means for each phase of said system including a silicon controlled rectifier (SCR) having its anode and cathode connected in series between said source and said load terminals for electrically connecting said terminals to or disconnecting said terminals from the energy in the associated phase of said source;
   b. polarity responsive means in each of said switching means for continuously preventing current wave forms of a first polarity relative to the wave forms in associated phase sources from connecting with said terminals;
   c. control means for each phase connected with each of said switching means for controlling the percentage of current wave forms of a second, opposite polarity connected to the load terminals;
   d. trigger pulse forming circuit means in each phase of said control means connected with the gate of the associated SCR for controlling conduction of said SCR during the occurrence in said phase of relatively positive wave forms of said source current;
   e. feedback means included in said control means for generating a feedback voltage representative of electrical changes in the source or electrical changes in a load connected to the load terminals, said feedback voltage in each phase being supplied to an amplifying, timing circuit to change the time of occurrence of grigger pulses produced by said pulse forming circuit means in each phase; and
   f. adjustable setting means included in said control means for establishing a desired current and/or voltage value at said output terminals.

11. A control system for regulating the energy transfer to electrical load terminals from a three phase, alternating current electrical source comprising:
   a. switching means for each phase of said system including a silicon control rectifier (SCR) having its anode and cathode connected in series between said source and said load terminals for electrically connecting said terminals to or disconnecting said terminals from the energy in the associated phase of said source;
   b. polarity responsive means in each of said switching means for continuously preventing current wave forms of a first polarity relative to the wave forms in associated source phases from connecting with said terminals;
   c. control means for each phase connected with each of said switching means for controlling the percentage of current wave forms of a second, opposite polarity conducted to the load terminals;
   d. trigger pulse forming circuit means included in each phase and connected with the gate of the associated SCR for controlling conduction of said SCR during the occurrence in said phase of relatively positive wave forms of said source current; and
   e. electronic switching means for reversing the polarity of the voltage applied to said load terminals.

12. A control system for regulating the energy transferred to electrical load terminals from a polyphase, alternating current electrical source comprising:
   a. switching means for each phase of said system for electrically connecting said terminals to or disconnecting said terminals from the energy in the associated phase of said source;
   b. polarity responsive means in each of said switching means for continuously preventing current wave forms of a first polarity relative to the wave forms in associated source phases from connecting with said terminal;
   c. control means for each phase connected with each of said switching means for controlling the percentage of current wave forms of a second, opposite polarity conducted to the load terminals; and d. automatic output control means for supplying a predetermined, substantially constant current and voltage to said load terminals for loads which vary substantially from short circuit to open circuit values.

13. A control system as defined in claim 12 further including inductive feedback control means for automatically changing the energy supplied to said load terminals as required to maintain a predetermined voltage level across aaid inductive means.

14. A control system as defined in claim 12 further including automatic feedback control means employing an earth ground reference for maintaining a substantially constant energy supply to said load terminals.

15. A control system as defined in claim 12 further including input regulating means for suppressing noise spikes in said source to isolate said control means from signals which may cause undesired switching of said switching means.

16. A control system as defined in claim 12 further including adjustment means between each phase of said source and said system for separately adjusting the amplitude of each source phase supplied to said system.

17. A control system as defined in claim 12 further including automatic feedback control in each of said control means for independently changing the amount of energy supplied by each phase to said load terminals as required to maintain a predetermined energy supply to said load terminals.

* * * * *